April 30, 1957 I. H. NORINE 2,790,194
WINDSHIELD WIPERS AND ATTACHMENTS THEREFOR
Filed Jan. 31, 1955 2 Sheets-Sheet 2
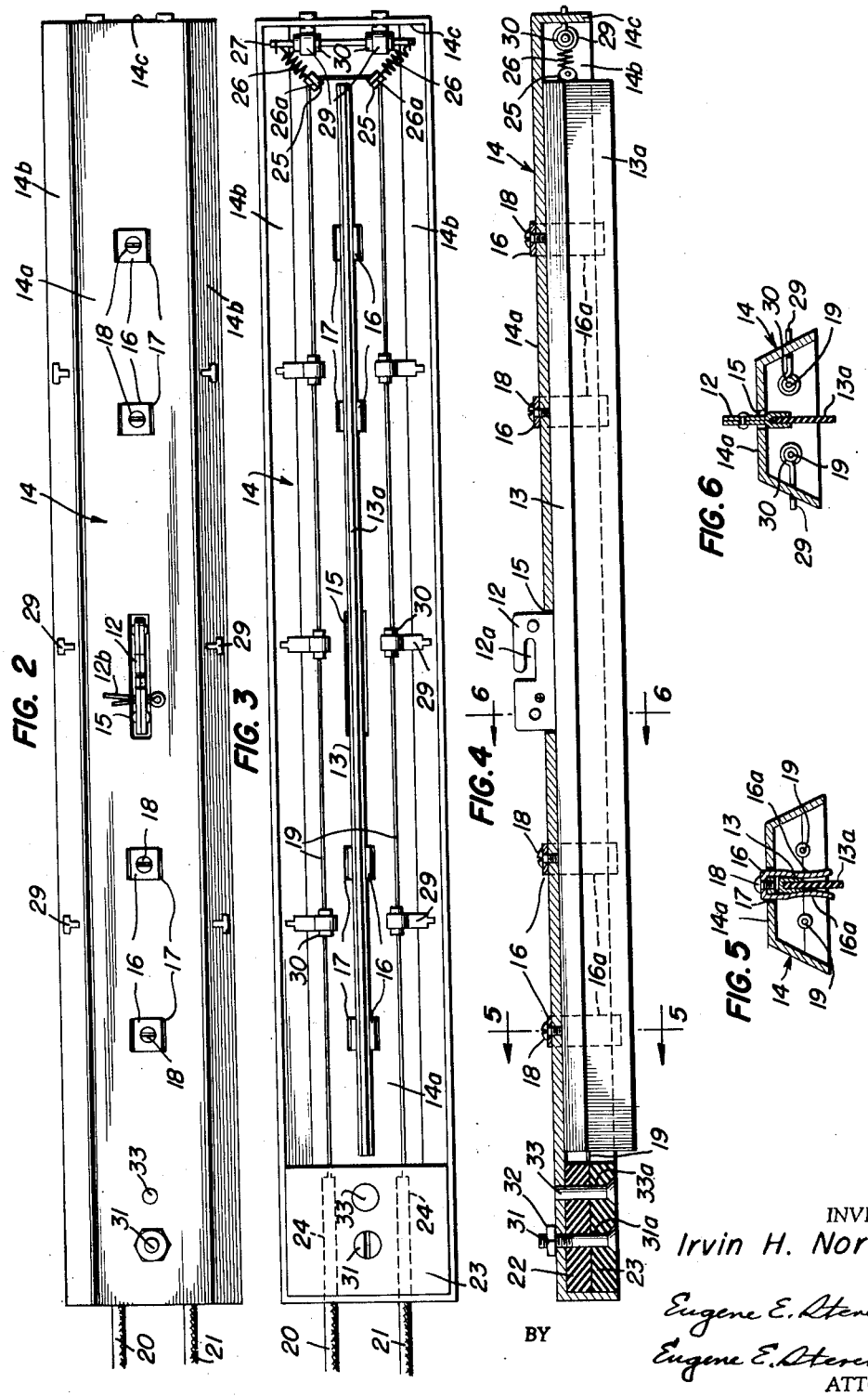
INVENTOR
Irvin H. Norine
BY Eugene E. Stevens and Eugene E. Stevens III
ATTORNEYS.

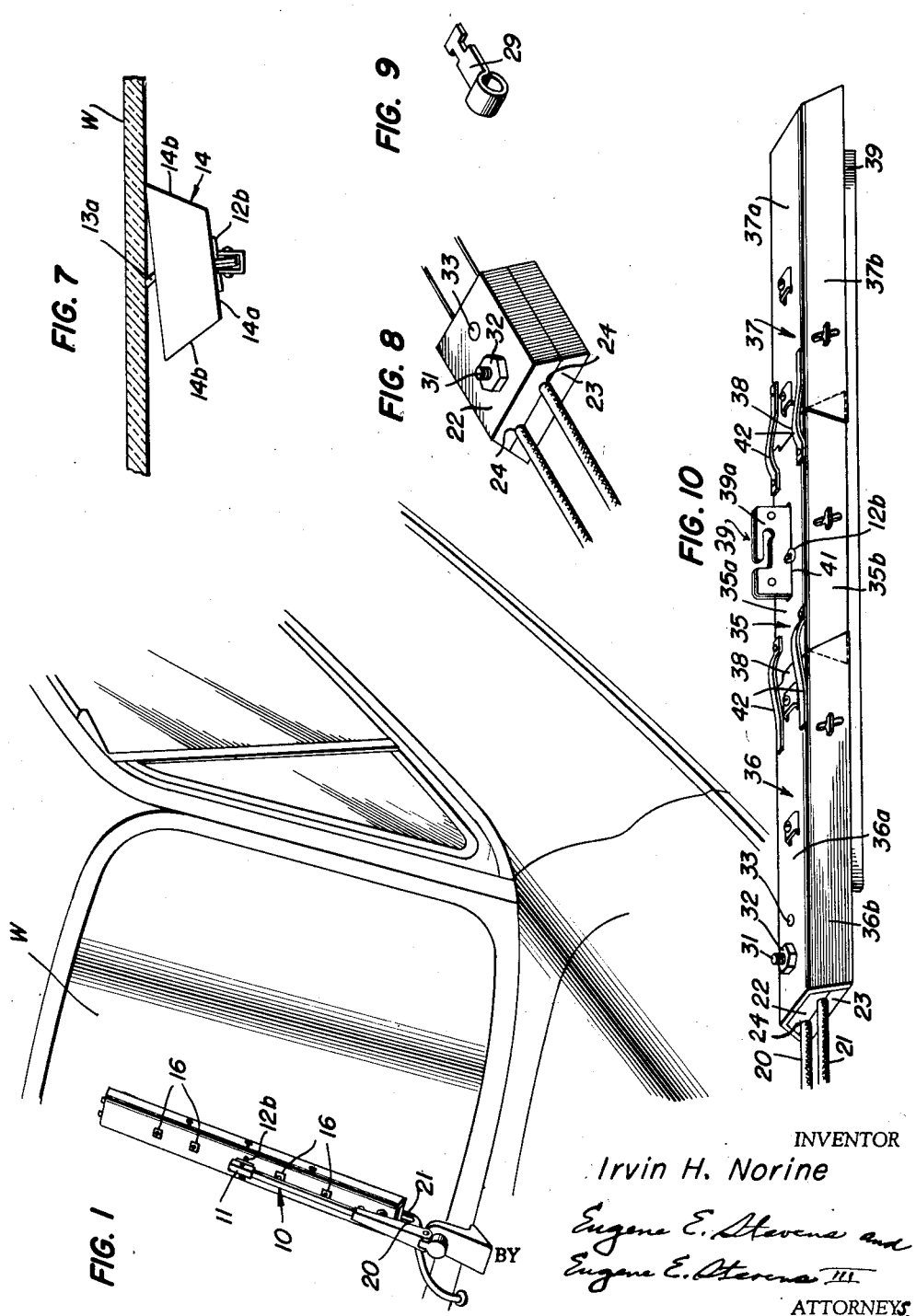

United States Patent Office 2,790,194
Patented Apr. 30, 1957

2,790,194

WINDSHIELD WIPERS AND ATTACHMENTS THEREFOR

Irvin H. Norine, Scottsbluff, Nebr.

Application January 31, 1955, Serial No. 484,977

11 Claims. (Cl. 15—250.5)

My invention relates to improvements in automobile windshield wipers and the like, with particular reference to a defrosting means for the wiper blade and the windshield surface over which the latter moves, although not limited thereto.

One of the primary problems confronting the automobile driver in sleety snowy weather is the maintenance of a clear view through the area of his windshield which is operated upon by the windshield wiper, or wipers. Not only does the snow or slush tend to build up on the windshield against opposite sides of the blade to diminish its movement in each direction and thus reduce the size of the normal wiper-provided vision area, but also ice forms on the blade itself with the result that the vision area of the windshield is soon rendered transluscent by a film of ice which has to be removed with a razor blade or knife.

Various means have been proposed to deal with the icy windshield problem including (1) a built-into-the-car defroster for flowing warm air against the windshield; (2) a heating coil built into the windshield or with a mount secured thereto by vacuum cups; or (3) the provision of a special windshield wiper with a built-in heating coil and blade assembly. But all of the expedients noted are open to objection primarily on the ground of either expense or lack of efficiency, and some on both scores. Thus the built-in hot air blowing defroster and the coil in the windshield type are expensive and can only be readily applied to cars during construction, while the vacuum cup-supported heating coil is not efficient and the various wiper incorporated heaters not only require special wiper units per se, but are lacking in efficiency.

With the foregoing as background, it is the primary object of my invention to provide an efficient electrically operated heating unit which can be readily assembled with the conventional windshield wiper blade in but a minute or two when occasion requires, can be as readily disassembled, and which will not only prevent ice formation on the windshield but also on the wiper blade as well.

More specifically, the invention contemplates a blade and windshield heating attachment for conventional windshield wiper blades which is simple and inexpensive in construction, and highly efficient in practical use.

A still further object of the invention is to provide in a device as characterized a heat confining and directing shell which receives the blade and relieves the latter of the major portion of any slush load at opposite sides thereof so that the blade will operate more efficiently.

The invention also resides in certain novel features of construction, combination and arrangement of the various parts, the means of assembly with the wiper blade, and in modes of operation of such parts, as will be apparent from a reading of the detailed description of the now preferred embodiment which is illustrated in the accompanying drawings, forming a part of this specification.

It is to be understood that the forms of the invention as disclosed in the drawings are to be taken as illustrative rather than limitative since it will be obvious to those versed in the art that my inventive concept is susceptible of other mechanical expressions within the spirit and scope of the subject matter claimed hereinafter.

In the drawings wherein the same reference characters have been used to designate the same parts wherever they appear throughout the several views—

Figure 1 is a perspective view showing application of the invention in use and applied to what may be and preferably is a conventional windshield wiper blade operating against a plane surfaced windshield;

Fig. 2 is a rear elevational view of the shell and wiper blade assembly;

Fig. 3 is a front elevational view of the assembly of Fig. 2;

Fig. 4 is a central longitudinal sectional view through the wiper-carried shell;

Figs. 5 and 6 are cross-sectional views taken on lines 5—5 and 6—6, respectively, of Fig. 4;

Fig. 7 is an end elevational view, a portion of a windshield being shown in section;

Fig. 8 is a perspective view of the coil and supply line terminal holder removed from the shell;

Fig. 9 is a perspective detail of an insulator holder; and

Fig. 10 is a perspective view of a slightly modified form of the invention for curved surfaced windshields.

Referring to the drawings by reference characters, and turning to Fig. 1, numeral 10 designates the usual driven oscillatory squeegee-carrying arm of a conventional automobile windshield wiper, the rubber squeegee blade and its metal backing, or carrier, being indicated by reference characters 13a, 13, respectively. Connection between the oscillatory arm 10 and the squeegee carrier 13 is, or may be, effected in the ordinary way, the free end of the arm 10 having the cross pin-incorporating socket 11 which receives the standard carrier lug 12, and the cross pin being engaged in the retaining seat 12a of lug 12, as usual.

In carrying out the invention, the back wall 14a of the shell 14 is provided, intermediate its ends, and approximately midway between its side walls 14b with the slot 15 through which the squeegee carrier lug 12 is projected as shown. To retain the shell 14 and squeegee carrier 13 assembled, a transverse hole 12c is bored through the lug 12 for insertion of the cotter pin 12b which spans the slot 15 so as to act as a stop and prevent the lug 12 from being backed through slot 15. However, in lieu of hole 12c cotter pin 12b can be projected through the receiving seat or slot 12a that also receives the socket pin. By preference the width of slot 15 will be slightly oversize with respect to the thickness of the lug 12 so as to admit of a slight relative transverse rocking of the parts for a purpose to be mentioned hereinafter.

As will be noted, cotter pin 12b retains the back edge of the squeegee carrier 13 closely adjacent, if not in actual contact with, the inner surface of the back wall 14a of shell 14; and since the depth of the shell 14 is considerably less than the depth of the combined squeegee blade 13a and its carrier 13, the working edge and adjacent portion of the squeegee 13a will project beyond the plane of the outer edges of the outwardly slanting side walls 14b of the shell 14 to engage the surface of the windshield W as best shown in Fig. 7.

As is well known the squeegee carrier 13 and its lug 12 rocks transversely of the arm socket 11 when the arm 10 changes direction of movement so that the working windshield-engaging edge of the squeegee blade 13a will be flexed rearwardly and "trail" so as to speak as it is moved in each direction. This mode of operation of the squeegee blade and carrier 13, 13a is taken advantage of in connection with an important feature of the instant invention, namely, that of causing the free edges of the outwardly slanted side walls 14b of the shell 14 to act as sleet deflectors or scrapers in the operation of the wiper as illustrated in Figure 2.

In carrying out the above noted phase of the invention it is necessary, as will be appreciated, that the shell 14 shall rock transversely substantially as a unit with the squeegee blade and carrier 13a, 13 but without undue strain on the carrier lug 12 or the shell stock adjacent the lug-receiving slot 15. It is desirable, although not absolutely necessary that there shall be a slight relative transverse yield between the shell 14 and the squeegee carrier 13 so that a too firm engagement of the edge of a wall 14b with the surface of windshield W will not materially lighten the pressure of the squeegee blade 13a against the windshield surface, and thus reduce the efficiency of the former. Therefore, I provide the series of preferably spring metal clips 16 which are carried by the back wall 14a of shell 14 and have the arms 16a engaging opposite sides of the carrier 13 and adjacent rear portions of the squeegee blade 13a.

Although in the illustrated form of the invention, the arms 16a of the clips 16 are projected through slots 17 in the back wall 14a of shell 14, and screws 18 taking in said wall and through the bights of the clips are employed to retain the latter in place, it will be obvious that the clips 16 may be otherwise mounted and secured.

It will be understood that the shell 14 may be employed as a scraper to precede the squeegee blade 13 without the employment of any heating means within the shell, although such means is desirable.

The heating means within the shell 14, as illustrated, herein comprises copper resistance wire strands 19, connected at one end to define a coil. The free ends of such wires 19 are electrically connected to the lead and ground connections 20, 21, which are supplied from the storage battery of the car. As illustrated in Figure 1 the current supply and return leads 20, 21 and related resistance wire terminals are clamped between block elements 22, 23 carried in one end of the shell 14. These block elements 22, 23 have opposed matching channels 24 within which the circuit connections 20, 21 and resistance wire (19) terminals are clamped.

The resistance wires 19 defining opposite sides of the heating coil are located within the shell 14 at opposite sides of the squeegee blade 13. The resistance wire strands 19 of the coil adjacent the end of the latter have secured thereto mica sleeves 25 which receive the hooked ends 26a of coil springs 26. These coil springs 26 function to maintain the resistance wire strands 19 of the coil taut. The coil springs 26 are connected by a bar 27, as illustrated in Figure 1, and this bar is anchored to the adjacent end wall 14c of the shell by means of carriers 29 the inner end of each of which terminates in a sleeve having a mica or other insulation material liner 30 through which said bar 27 extends.

Similar carriers 29 are carried by and projected through the side walls 14b of the shell and also have their sleeve form inner ends provided with mica or other insulating sleeves 30. The strand (19) defining sides of the heating coil extend through and are supported by these latter sleeves 30.

Means for securing the block elements 22, 23 in the end of the shell 14 will now be described. In carrying out this phase of the invention I provide the outer block member 23, which is nearest the windshield surface, with two upstanding studs 31, 33, the other block member 22 having holes through which said studs extend. The stud 31 is threaded to receive the nut 32 and is projected through a hole in the back wall 14a of the shell 14. Thus when the nut 32 is applied to the stud 31 it will serve not only to clamp the block elements 22, 23 together, but also to secure the same firmly in place as an assembly against the inner surface of the back wall 14a of the shell 14.

The form of invention herein above described is primarily applicable to plane surfaced windshields, and I will now describe a slightly modified form of the invention for use in connection with the curved surfaced windshields with which many automobiles are equipped.

Referring to the modified form of the invention disclosed in Figure 8, the blade-receiving shell is seen to comprise the central section 35 and the inner and outer end sections 36, 37 respectively. The end sections 36, 37 are hinged as at 38 to the central section 35 so that in the operation of the wiper blade the sidewall edges 35b, 36b, 37b will generally conform to the slope or curvature of the windshield surface being operated upon. It is to be noted that the outer ends of the side walls 35b of the central section 35 and the adjacent portions of the side walls 36b, 37b of the outer shell sections are disclosed in overlapping relationship so that no sharp corners will be opposed to the windshield surface.

The Figure 10 form of the invention involves the connected resistance wire strand 19 previously described and likewise the associated tensioning springs 26 and the insulated carrier members 29, also previously referred to. Likewise the lead and return connections 20, 21 to the battery and the adjacent ends of the resistance wire strands 19 are clamped between block elements 22, 23 the assembly of which latter is secured to the back wall 36a of shell section 36 by the thread stud and nut arrangement already mentioned.

The conventional squeegee blade and carrier 39 therefor which is used for curved surfaced windshields conforms to the windshield surface curvature as the wiper arm moves back and forth. Therefore, in order to cause the side wall-provided scraper edges 35b, 36b, 37b of the shell sections 35, 36, 37 to conform substantially to the windshield surface curvature I provide the leaf springs 42 which are carried by the back wall 35a of the central shell section 35 and bear against the back walls 36a, 37a of the adjacent shell sections, as shown. The lug 39a of the squeegee carrier 39 extends through the slot 41 in the back wall of the central shell section 35a, as in Fig. 1, and is likewise retained in place by the cotter pin 12b, as in the first described form of the invention. The back walls of the shell sections 35, 36, 37 carry the squeegee-carrier sustaining clips 16 which support the squeegee carrier as noted in connection with the Fig. 1 form of the invention.

From the foregoing description read in connection with the accompanying drawings, it is believed that the illustrated embodiments of my invention will be readily understood and the advantages thereof appreciated.

Having just described my invention what I claim is:

1. A defrosting attachment for the detachable wiper arm-carried squeegee blade carrier of a power-operated automobile windshield wiper or the like and comprising in combination with said carrier and its wiper arm attaching lug; an elongated blade and carrier-receiving shell which is at least coextensive in length with and wider than said carrier and blade and provides back, side and end walls and is open at its front for projection of the squeegee blade toward the windshield, said shell having a slot in its back wall intermediate the sides and ends of the latter and through which slot said carrier lug is projected to dispose the rear edge of the carrier adjacent the inner surface of said back wall of the shell, electrical heating means carried by and within said shell and spaced from opposite sides of said squeegee carrier, there being a current supply means for said heating means, fastening means retaining the rear edge of said carrier adjacent the back wall of said shell and maintaining said lug projected through said slot whereby to retain said parts assembled, shell-carried members between opposite side walls of said shell and engaging opposite sides of the carrier at least at longitudinally spaced points whereby to cause said shell to rock transversely with said squeegee and carrier when the wiper arm changes direction in its to and fro movement so that the leading side edge of the shell will at least closely approach the windshield surface to function as a slush scraper.

2. The combination set forth in claim 1, and supports for said heating means and including side wall-carried elements and a two-section clamp block which latter is located adjacent one end of said shell, opposed faces of said block sections having opposed open ended recesses receiving overlapped ends of said heating and supply means, and a securing means detachably clamping said block sections together and the block to the back wall of said shell.

3. The combination set forth in claim 1, and said carrier fastening means comprising a stop element removably carried by said carrier lug and extending across said slot of the back shell wall.

4. The combination set forth in claim 1, and said shell-carried carrier engaging members being yieldable, and the lug-receiving slot of said back wall being of a width at least slightly greater than the thickness of said carrier lug whereby to admit of slight transverse rocking of the squeegee carrier with respect to the shell.

5. The combination set forth in claim 1, and where the squeegee carrier is flexible in a plane normal to the windshield surface, said shell comprising intermediate and end sections, transversely disposed hinge means connecting said shell sections, and yielding means carried by the intermediate shell section and acting against the respective end sections to urge the latter toward the back edge of said carrier whereby the end shell sections will follow the end portions of a squeegee carrier for curved windshields.

6. The combination set forth in claim 1, and where the squeegee carrier is flexible in a plane normal to the windshield surface, shiftable opposite side wall portions incorporated in said shell and movable toward and away from said windshield, and yieldable shell-carried means normally urging said shiftable side wall portions toward the windshield surface whereby edges of such side wall portions will function as slush deflectors for curved windshields.

7. A sleet-removing attachment for the detachable wiper arm-carried squeegee blade carrier of a power-operated automobile windshield wiper or the like and comprising in combination with said carrier and its wiper arm attaching lug; an elongated blade and carrier-receiving shell which is at least coextensive in length with and wider than said carrier and blade and provides back, side and end walls and is open at its front for projection of the squeegee blade toward the windshield, said shell having a slot in its back wall intermediate the sides and ends of the latter and through which slot said carrier lug is projected to dispose the rear edge of the carrier adjacent the inner surface of said back wall of the shell, fastening means retaining the rear edge of said carrier adjacent the back wall of said shell and maintaining said lug projected through said slot whereby to retain said parts assembled, shell-carried members between opposite walls of said shell and engaging opposite sides of the carrier at least at longitudinally spaced points whereby to cause said shell to rock transversely with said squeegee and carrier when the wiper arm changes direction in its to and fro movement so that the leading side edge of the shell will at least closely approach the windshield surface to function as a slush scraper.

8. The combination set forth in claim 7, and said carrier fastening means comprising a stop element removably carried by said carrier lug and extending across said slot of the back shell wall.

9. The combination set forth in claim 7, and said shell-carried carrier engaging members being yieldable, and the lug-receiving slot of said back wall being of a width at least slightly greater than the thickness of said carrier lug whereby to admit of slight transverse rocking of the squeegee carrier with respect to the shell.

10. The combination set forth in claim 7, and where the squeegee carrier is flexible in a plane normal to the windshield surface, said shell comprising intermediate and end sections, transversely disposed hinge means connecting said shell sections, and yielding means carried by the intermediate shell section and acting against the respective end sections to urge the latter toward the back edge of said carrier whereby the end shell sections will follow the end portions of a squeegee carrier for curved windshields.

11. The combination set forth in claim 7, and where the squeegee carrier is flexible in a plane normal to the windshield surface, shiftable opposite side wall portions incorporated in said shell and movable toward and away from said windshield, and yieldable shell-carried means normally urging said shiftable side wall portions toward the windshield surface whereby edges of such side wall portions will function as slush deflectors for curved windshields.

References Cited in the file of this patent

UNITED STATES PATENTS

| | | |
|---|---|---|
| 1,730,465 | Lochrie | Oct. 8, 1929 |
| 2,034,880 | Sockett | Mar. 24, 1936 |
| 2,322,312 | Osborn | June 22, 1943 |
| 2,601,664 | Nesson | June 24, 1952 |